US012791345B2

(12) United States Patent
Jobson et al.

(10) Patent No.: US 12,791,345 B2
(45) Date of Patent: Nov. 10, 2026

(54) METHOD FOR CONTROLLING A VEHICLE, A CONTROL SYSTEM FOR A VEHICLE

(71) Applicant: VOLVO TRUCK CORPORATION, Gothenburg (SE)

(72) Inventors: Edward Jobson, Romelanda (SE); Adam Stahl, Sävedalen (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 33 days.

(21) Appl. No.: 18/909,503

(22) Filed: Oct. 8, 2024

(65) Prior Publication Data

US 2025/0123112 A1 Apr. 17, 2025

(30) Foreign Application Priority Data

Oct. 16, 2023 (EP) .................................... 23203722

(51) Int. Cl.
*G01C 21/00* (2006.01)
*B60W 40/02* (2006.01)
(Continued)

(52) U.S. Cl.
CPC ......... *G01C 21/3617* (2013.01); *B60W 40/02* (2013.01); *G06F 17/147* (2013.01); *B60W 2050/0057* (2013.01)

(58) Field of Classification Search
CPC ............ G01C 21/3617; G01C 21/3841; G01C 21/3848; G01C 21/3822; B60W 40/02;
(Continued)

(56) References Cited

U.S. PATENT DOCUMENTS

2014/0379254 A1* 12/2014 Miksa .................... G01C 21/30 701/450
2018/0025638 A1* 1/2018 Fulger ................ G01C 21/3453 455/456.3

(Continued)

FOREIGN PATENT DOCUMENTS

| | | | | |
|---|---|---|---|---|
| DE | 102012009674 A1 * | 9/2013 | ............. | G01C 21/26 |
| KR | 20200075922 A * | 6/2020 | .......... | B60W 60/001 |
| WO | 16057557 A1 | 4/2016 | | |

OTHER PUBLICATIONS

Extended European Search Report in corresponding European Application No. 23203722.6 dated Apr. 17, 2024 (10 pages).

(Continued)

*Primary Examiner* — Erin D Bishop
*Assistant Examiner* — Brittany Renee Peko
(74) *Attorney, Agent, or Firm* — Jeffri A. Kaminski; Venable LLP

(57) ABSTRACT

The present disclosure relates to a method for generating a part of a vehicle control strategy for a vehicle following a route to a destination, said route extending through one or more route segments, the method comprising: obtaining one or more data streams over time from the vehicle, said one or more data streams containing at least one measurable data parameter; transforming each time sequence of one type of obtained data streams to a frequency representation; identifying, one or more relevant components of the frequency spectrum; quantifying the identified one or more relevant components of the frequency spectrum; associating the identified and quantified relevant components of the frequency spectrum with a given road segment of the route; combining the associated, quantified and identified relevant
(Continued)

components of the frequency spectrum for the given road segment from different types of data streams into one route characteristics record.

15 Claims, 6 Drawing Sheets

(51) Int. Cl.

| | |
|---|---|
| ***G01C 21/36*** | (2006.01) |
| ***G06F 17/14*** | (2006.01) |
| *B60W 50/00* | (2006.01) |

(58) Field of Classification Search

CPC ......... B60W 2050/0057; B60W 40/06; B60W 50/0097; G06F 17/147

See application file for complete search history.

(56) References Cited

U.S. PATENT DOCUMENTS

| | | | | |
|---|---|---|---|---|
| 2018/0111623 | A1 | 4/2018 | Augst | |
| 2018/0170349 | A1* | 6/2018 | Jobson | B60L 7/18 |
| 2018/0324595 | A1* | 11/2018 | Shima | H04W 16/10 |
| 2020/0201325 | A1* | 6/2020 | Parekh | G06F 9/50 |
| 2021/0158707 | A1 | 5/2021 | Tong et al. | |
| 2021/0164786 | A1 | 6/2021 | Young et al. | |

OTHER PUBLICATIONS

European Communication pursuant to Article 94(3) EPC dated Apr. 23, 2026 in corresponding European Patent Application No. 23203722.6, 10 pages.

* cited by examiner

METHOD FOR CONTROLLING A VEHICLE, A CONTROL SYSTEM FOR A VEHICLE

TECHNICAL FIELD

The disclosure relates generally to methods for controlling a vehicle. In particular aspects, the disclosure relates to methods for generating a part of a vehicle control strategy for a vehicle. The disclosure also relates to control systems for a vehicle. In addition, the disclosure relates to a vehicle comprising such a control system. The disclosure can be applied in heavy-duty vehicles, such as trucks, buses, and construction equipment. Although the disclosure may be described with respect to a particular vehicle, the disclosure is not restricted to any particular vehicle.

BACKGROUND

With the introduction of more advanced vehicle systems for controlling a vehicle along a route, there has been an increasing activity for developing new and adequate solutions for dynamic and reliable operations based on changes along the route. By way of example, commercial vehicles that are used for predestined transports often follow patterns of routes and drivetimes.

In addition, with the introduction of new energy storage and power systems in various types of vehicles, such as batteries and fuel cells in heavy-duty vehicles, there has also been an increasing activity for developing more energy efficient control systems for operating a vehicle along a route.

Examples of such supportive control systems may include speed settings, planning of electric charging positions and times, preparing battery temperature for fast charging, managing on-board energy use for climate, managing battery charging for route range requirement, managing battery charging for downhill brake performance and optimizing vehicle control for shortest time for assignment.

Another area of interest for improving the efficiency in operating a heavy-duty electric vehicle is to determine and predict driving patterns of a vehicle operating along a route. By way of example, a vehicle can be operated by means of an Advanced Driver Assistance Systems (ADAS), to improve driving safety and comfort. ADAS safety features are designed to avoid collisions and accidents by offering technologies that warn drivers of potential problems, or to avoid collisions by implementing safeguard measures and taking control of the motor vehicles. Adaptive features can automate lighting, provide adaptive cruise control, automate braking, incorporate GPS/traffic signaling, connect smartphones, alert drivers of other motor vehicles of hazards, keep drivers in the right lane, or show what is in blind spots. ADAS technology may generally be based on vision/camera systems, sensory systems, automotive data networks, vehicle-to-vehicle (V2V) or vehicle-to-infrastructure (V2I) communication systems.

While there are a number of different types of systems for controlling a vehicle as well as a number of different types of control strategies for operating the vehicle along a route, there is still a need for an improved control of a vehicle operating along a route to complete a transportation mission.

SUMMARY

According to a first aspect of the disclosure, there is provided a method for generating a part of a vehicle control strategy for a vehicle following a route to a destination. The route extends through one or more route segments. The method is implemented by a control system comprising one or more processor devices, one or more sensors and a storage medium. The method comprises obtaining, via the one or more sensors, one or more data streams over time from the vehicle, the one or more data streams containing at least one measurable data parameter; transforming, by the one or more processor devices, each time sequence of one type of obtained data streams to a frequency representation; identifying, by the one or more processor devices, one or more relevant components of the frequency spectrum; quantifying, by the one or more processor devices, the identified one or more relevant components of the frequency spectrum; associating, by the one or more processor devices, the identified and quantified relevant components of the frequency spectrum with a given road segment of the route; combining, by the one or more processor devices, the associated, quantified and identified relevant components of the frequency spectrum for the given road segment from different types of data streams into one route characteristics record; and storing the generated route characteristics record in the storage medium.

The first aspect of the disclosure may seek to improve identifying patterns in use of vehicles in the frequency domain. The proposed method is based on the insight that vehicles travelling along a route, e.g. a reoccurring route, may benefit from data relating to previous operations along the route, in particular when adapting a vehicle control strategy for an electric vehicle. In addition, it has been observed that many services offered to vehicles are based on position and utilization. Forecasting position and usage may enable an improved planning and more tailormade service offers.

One challenge in detecting patterns and predicting forecasts is the high number of options at every point in time. Sometimes, it may be helpful to use several parameters, e.g. historical use of other vehicles, such as "other vehicles driving on this route A at this weekday at this time of day carrying similar load, have later continued on route B". However, this approach of detecting similarities by predetermined frequencies, weeks, and hour of day in the example above may pose limitation as for which type of patterns that can be detected. For example, vehicles that travel the route every 5th day or every 11th hour may not appear when weekly or daily patterns are analysed. By identifying patterns in use of vehicles in the frequency domain, the proposed method allows for revealing repetitive patterns irrespectively of the calendar time between the events.

The proposed method may also allow for predicting more accurately that a vehicle travel a certain route every $10^{th}$ day. In this manner, the method may not need to estimate the reoccurring frequency, e.g. weekly, monthly etc. Rather, the period is a response of the analysis. It may also predict any other property connected to the reoccurring event, such as e.g. speed, time, energy use, intermediate stops and position of stops. By the proposed method, it thus becomes possible to reveal occurrences that cannot be foreseen with other hitherto known methods.

Another technical benefit may include to provide a more accurate and efficient identification of driving patterns and mapping the driving patterns so as to contribute to a more reliable transportation of goods by the vehicle along a route to a destination. By way of example, the provision of transforming each time sequence of one type of obtained data streams to a frequency representation allows for providing a less complex process of identifying and quantifying the relevant data and components for providing the route characteristics records. In general, the term "route characteristics record" may be considered as a "fingerprint file" containing data of various driving patterns, as defined in the frequency domain, of a vehicle along the route.

The proposed method may generally also need less computational resources than hitherto know prior art methods.

The proposed method further provides for a more self-learning way of identifying patterns, and may consistently improve the identification and use of patterns by transforming each time sequence of one type of obtained data streams to a frequency representation etc.

In some examples, the method may further comprise obtaining the one or more data streams containing at least one measurable data from one or more sensors arranged to measure one or more vehicle position parameters of the vehicle. A technical benefit may include a more accurate forecast of the position of the vehicle along the route and/or the given route segment.

In some examples, the method may further comprise obtaining the one or more data streams containing at least one measurable data from one or more sensors arranged to measure one or more vehicle operating parameters along the given route segment. A technical benefit may include a more accurate forecast of the vehicle operational performance and/or vehicle status along the route segment.

The one or more vehicle operating parameters may comprise any one of the following: vehicle pay-load data, vehicle speed, energy storage system type, energy storage system status and characteristics, internal combustion engine system type, electric machine characteristics, operational characteristics of any auxiliary equipment, vehicle specification data.

In some examples, the method may further comprise obtaining the one or more data streams containing at least one measurable data from one or more sensors arranged to measure one or more vehicle environmental parameters. A technical benefit may include a more accurate determination of the environment surrounding the vehicle along the route and/or the route segment.

The at least one measurable data from the one or more sensors arranged to measure one or more vehicle environmental parameters may comprise any one of an ambient temperature and a weather condition parameter. A technical benefit may include an even more accurate determination of the environment surrounding and the energy required to operate the vehicle along the route and/or the route segment.

The provision of transforming each time sequence of one type of data streams to a frequency representation may be performed by any one of a Discrete Cosine Transform, a Fourier transformation and a Z-transform. A technical benefit may include a more efficient and accurate transformation of each time sequence of one type of data streams to the frequency representation.

The provision of identifying relevant components in the frequency spectrum may be performed by applying a machine learning technique. A technical benefit may include a more efficient and automated transformation of each time sequence of one type of data streams to the frequency representation.

The provision of associating the identified and quantified relevant components in the frequency spectrum with a given road segment may further comprise associating the identified and quantified relevant components in the frequency spectrum to a direction of travelling. A technical benefit may include an improved association of the relevant components in relation to the vehicle and the route segment.

The provision of combining the associated, quantified and identified relevant components in the frequency spectrum for the given road segment from different types of data streams into one route characteristics record may be performed on any one of a road segment level and a route level comprising a number of road segments. A technical benefit may include an increased accuracy in forecasting vehicle related parameters such as future position, energy use and time of arrival.

In some examples, the method may further comprise obtaining different types of data streams from the vehicle, and iterating the steps of transforming, identifying, quantifying and associating for the obtained different types of data streams. In this manner, it becomes possible to provide a more comprehensive view of the route situation in view of the vehicle characteristic.

In some examples, at least one stored route characteristics record may be used for adapting a vehicle control strategy. The method may further comprise: determining a current vehicle position along the route, a current time and a current vehicle operating state; accessing the storage medium to acquire one or more historical generated route characteristics records; comparing the determined current vehicle position, current time and current vehicle operating state with corresponding historical data from the one or more historical generated route characteristics records so as to identify one or more matching characteristics therebetween; based on the comparison, selecting an identified matching route characteristics record or combining different route characteristics records to form a matching composite route characteristics record of several route characteristics records; extracting one or more route and vehicle operational requirements from the selected route characteristics record or selected composite route characteristics record; and adapting the vehicle control strategy based on the extracted one or more route and vehicle operational requirements, the current vehicle position along the route, the current time and the current vehicle operating state, wherein said vehicle control strategy is provided to set at least one operating parameter to control the operation of the vehicle. A technical benefit may include a more dynamic and advanced control of the vehicle along the route and the route segment(s). A vehicle may for example use more power for additional time as the thermal margin of the electrical machine can be more accurately predicted.

The term "control strategy" may include any setting of control parameters related to the operation of the vehicle, as well as activities aimed at assisting the operator of the vehicle. In particular, the control strategy may relate to scheduling of battery charging, delaying or expediting particulate regeneration or a change, limitation or scheduling of any other operating parameter. Examples of operating parameters of a vehicle include e.g. speed, engine RPM (revolutions per minute), heater power, climate system compressor power, onboard media systems, lights/lamps, other onboard subsystems, etc.

In some examples, the method may further comprise informing an operator of the vehicle of any desired or needed changes to the operating parameter. In this manner, an even more user-friendly control of the vehicle may be provided. As the vehicle has detected the fingerprint use and make accurate predictions of the future events it may e.g. initiate preheating of the battery to enable fast charging at the next stop, without any driver interaction.

According to a second aspect of the disclosure, there is provided a computer program product comprising program code for performing, when executed by the one or more processor devices, the method of first aspect.

According to a third aspect of the disclosure, there is provided a control system comprising one or more sensors and one or more processor devices configured to perform the steps of the method according to the first aspect.

According to a fourth aspect of the disclosure, there is provided a non-transitory computer-readable storage medium comprising instructions, which when executed by the one or more processor devices, cause the one or more processor devices to perform the method of the first aspect.

According to a fifth aspect of the disclosure, there is provided a vehicle comprising one or more processor devices to perform the method according to the first aspect of the disclosure and/or a control system according to according to the third aspect of the disclosure. The vehicle may be an electric vehicle, such as a fully or hybrid electrical vehicle, and further comprising an energy storage system and an electric propulsion system. The vehicle may be an electrical, hybrid, or plug-in hybrid vehicle. The vehicle may comprise an electric machine, wherein the energy storage system provides power to the electric machine for providing propulsion for the electrical, hybrid, or plug-in hybrid vehicle. In some examples, the vehicle may include a number of different energy storage systems in the form of a battery system and a fuel cell system, wherein the energy storage systems together provide power to the electric machine for providing propulsion for the electrical, hybrid, or plug-in hybrid vehicle.

Effects and features of the second, third, fourth and fifth aspects are largely analogous to those described above in relation to the first aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

The disclosed aspects, examples (including any preferred examples), and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure. The detailed description set forth below provides information and examples of the disclosed technology with sufficient detail to enable those skilled in the art to practice the disclosure.

Figure 1:
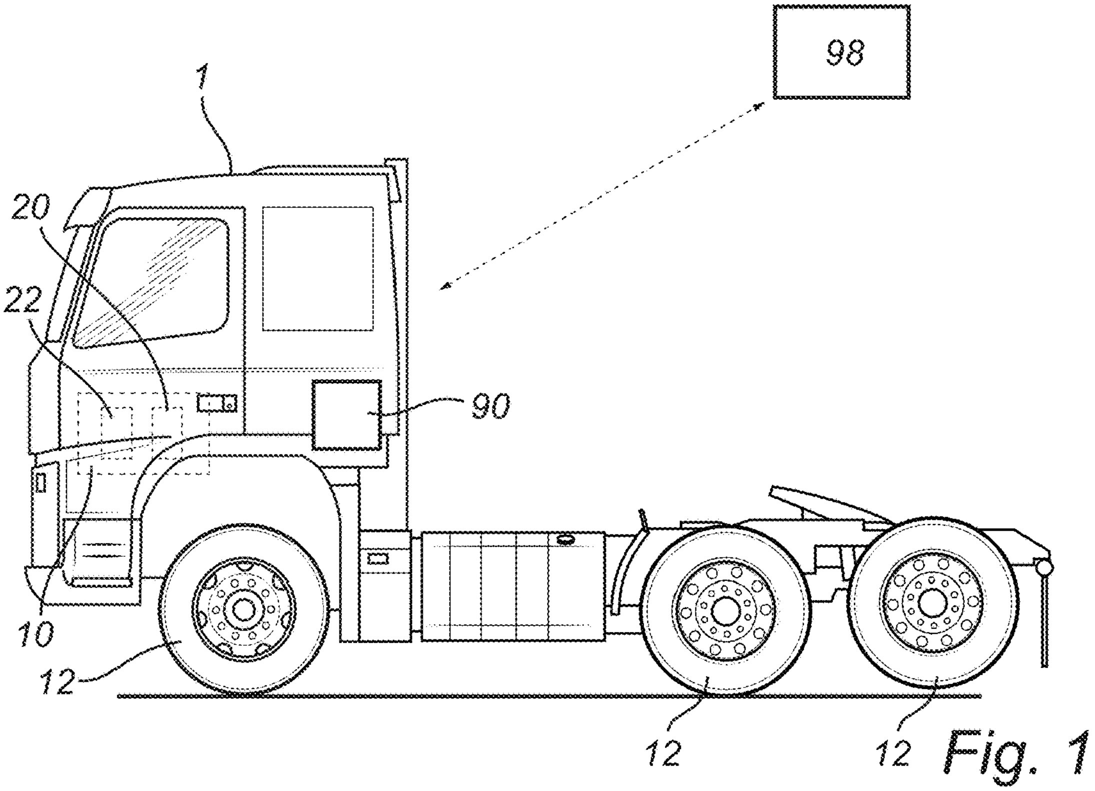
FIG. 1 is an exemplary vehicle according to one example.

FIG. 1 depicts a side view of an exemplary vehicle 1 according to one example. The vehicle 1 is here a truck, more specifically a heavy-duty truck for towing one or more trailers (not shown). Even though a heavy-duty truck 1 is shown it should be noted that the disclosure is not limited to this type of vehicle but may be used for any other type of vehicle, such as a bus, construction equipment, e.g. a wheel loader and an excavator, and a passenger car.

The vehicle 1 is here also illustrated as an electric truck. In this example, the electric truck is a fully electrical vehicle. Thus, the electric truck 1 comprises an electric powertrain system 10, also denoted as an electric propulsion system, configured to provide traction power to the vehicle. By way of example, the electric powertrain system 10 comprises one or more battery systems 20 and one or more electric machines 22. Hence, the vehicle 1 may comprise an exemplary battery system 20 in electric connection with an exemplary electric machine 22.

The battery system 20 is generally an integral part of the electric powertrain system 10. The battery system 20 here comprises a number of battery packs having corresponding battery cells. The battery system 20 is electrically connected to the electric machine 22 to provide power to the electrical machine 22, whereby the electrical machine 22 can provide traction power to one or more wheels 12, or any other types of ground engaging members. The electric machine 22 may generally include a conventional electric motor suitable for a heavy-duty vehicle. The battery system 20 may additionally or alternatively be used for powering other electric power consumers of the vehicle, such as an electric motor for a refrigerator system (not shown), an electric motor for an air conditioning system (not sown) or any other electric power consuming device and/or function of the vehicle 1.

In some examples, the vehicle 1 may also, or alternatively, comprise a fuel cell system, FCS (not illustrated). The FCS may be electrically connected to the electric machine 22 to provide power to the electrical machine 22, whereby the electrical machine 22 can provide traction power to one or more wheels 12, or any other types of ground engaging members. The electric machine may generally include a conventional electric motor suitable for a heavy-duty vehicle.

The electric powertrain system 10 of the vehicle 1 may further comprise additional components as are readily known in the field of electrical propulsions systems, such as a transmission (not shown) for transmitting a rotational movement from the electric machine(s) to a propulsion shaft, sometimes denoted as the drive shaft (not shown). The propulsion shaft connects the transmission to the wheels 12. Furthermore, although not shown, the electric machine 22 is typically coupled to the transmission by a clutch. The traction electric machine 22 of the vehicle 1 is thus arranged to receive electric power from any one of the battery system 20 and/or the FCE.

Figure 7:
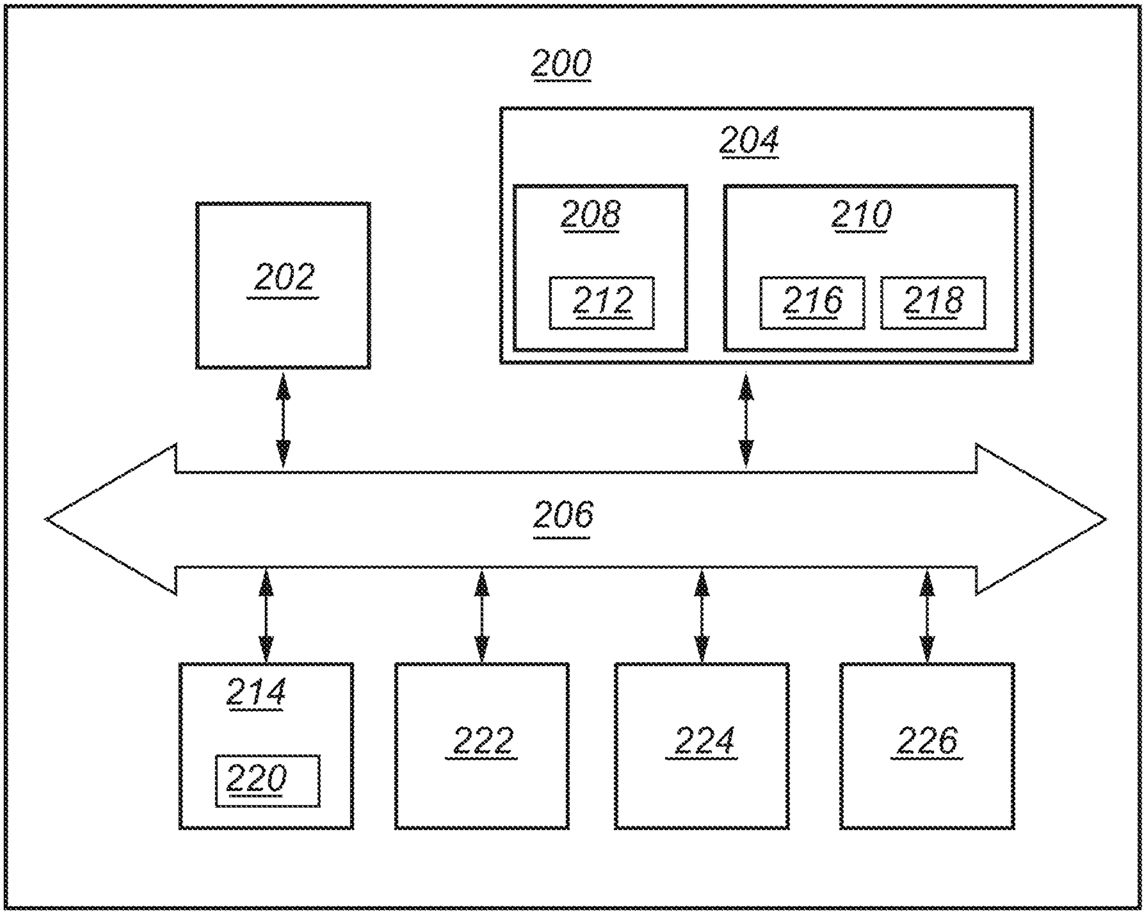
FIG. 7 is a schematic diagram of an exemplary computer system for implementing examples disclosed herein, according to one example.

As illustrated in FIG. 1, the vehicle 1 further comprises a control system 90 according to one example. The control system 90 is arranged and configured to be in communication with the vehicle 1, the electric powertrain system 10, the battery system 20, FCS and the electric machine 22. The control system 90 is used for operating the vehicle 1 including the electrical powertrain system 10. The control system 90 generally comprises a processing circuitry and a storage memory. One example of the control system 90 will be further described in relation to FIG. 7, illustrating a control system in the form of a computer control system 200. The control system 90 can be a part of an electronic control unit (ECU) for controlling the vehicle 1 and various parts of the vehicle, such as the electrical powertrain system 10, the battery system 20, electric machine, and the FCE, and/or any suitable components of the vehicle 1. Even though an on-board control system 90 is shown, it should be readily appreciated that the control system 90 could also be a remote control system, i.e. an off-board control system, or a combination of an on-board and off-board control system.

The control system 90 may be configured to control the vehicle and the electrical powertrain system by issuing control signals and by receiving status information relating to the vehicle, battery system, electric machine, FCS and the electrical powertrain system.

In FIG. 1, the control system 90 is in communication with a remote server 98. This remote server 98 may be arranged to perform various configurations of the ECU, and to provide various forms of data to the ECU 90, such as providing data streams containing various parameters for controlling the vehicle 1. The remote server 98 and the communication between the remote server 98 and the control system 90, such as the ECU, will be further described in relation to FIG. 2.

It should be noted that the vehicle 1 may likewise be a vehicle combination. Such vehicle combination may comprise a tractor unit, i.e. a towing vehicle, which is arranged to tow a trailer, e.g. in the form of a semitrailer. As such, the truck 1 may comprise a vehicle control unit (VCU) 90 arranged to control various functions of the vehicle combination. The trailer may be articulated connected to the towing vehicle 1. The trailer unit may optionally also comprise a corresponding VCU, which then controls one or more functions on the trailer. The VCU or VCUs may be communicatively coupled, e.g., via wireless link, to the remote server 98, as shown e.g. in FIG. 1.

Figure 2:
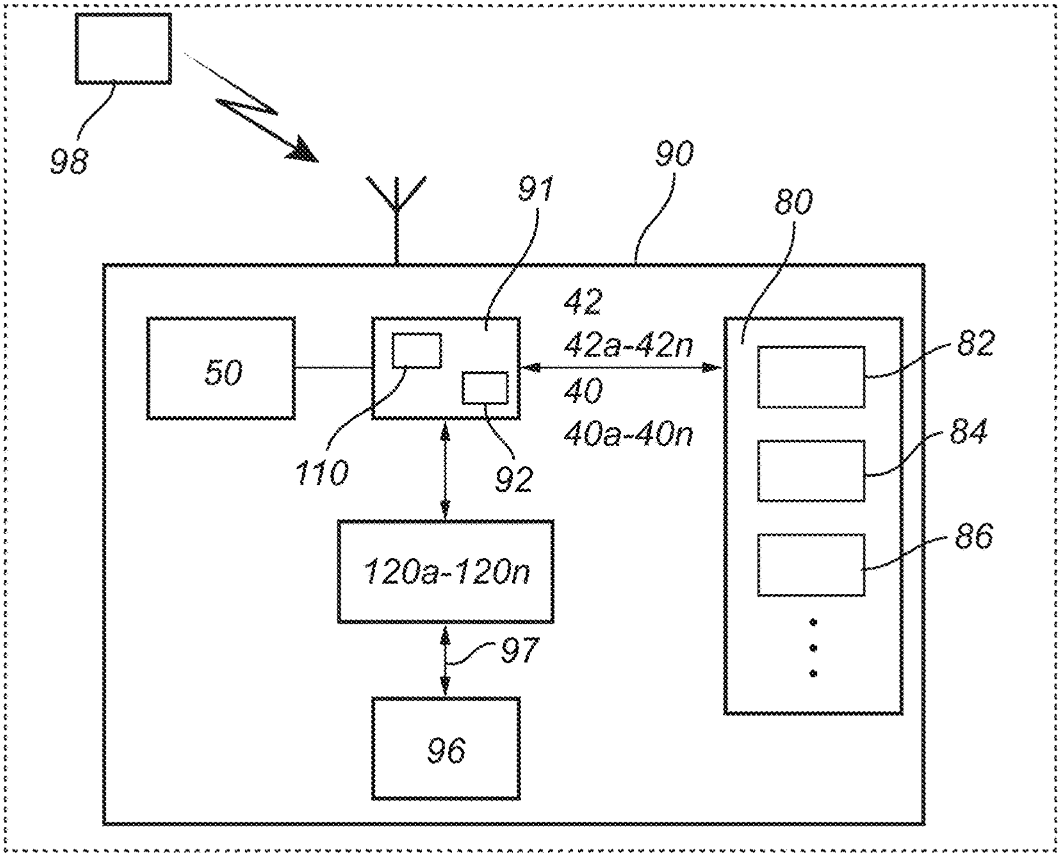
FIG. 2 is an exemplary system for controlling the vehicle in FIG. 1, according to one example.
Figure 6A:
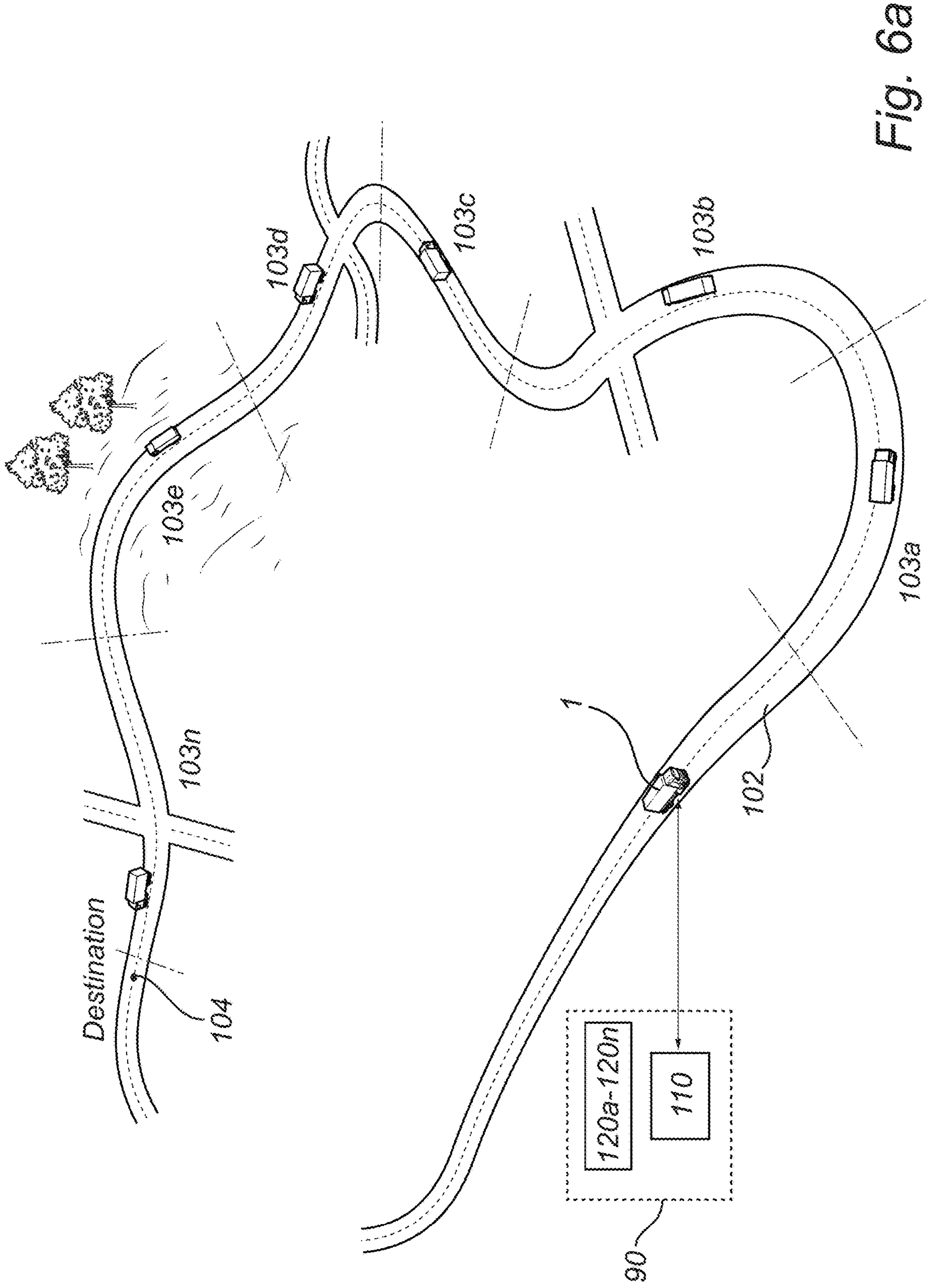
FIGS. 6A and 6B are examples of a vehicle implementing a method according to one example.

Turning now to FIG. 2, there is illustrated one example of the control system 90. The functionality of the control system in FIG. 2 will be described in conjunction with FIGS. 6*a* and 6*b*. FIG. 6*a* schematically illustrates the vehicle 1 operating along a route 102. The control system 90 is configured to generate a part of a vehicle control strategy 110 for the vehicle 1 following the route 102 to a destination 104, as illustrated in FIG. 6*a*. As depicted in FIG. 6*a*, the route can be split into a number of route segments 103*a* to 103*n*. Hence, the route 102 extends through one or more route segments 103*a* to 103*n*.

As described herein, and also illustrated in FIG. 2, the control system 90 comprises one or more processor devices 91, a sensor arrangement 80 and a storage medium 96. The sensor arrangement 80 comprises a number of sensors 82, 84 and 86. The sensors 82, 84 and 86 of the sensor arrangement 80 is in communication with the one or more processor devices 91 of the control system 90. It should be noted that the sensors of the sensor arrangement may be arranged within vehicle, on the vehicle, and/or external from the vehicle.

The sensors 82, 84 and 86 of the sensor arrangement 80 are arranged to provide data streams 40, 40*a* to 40*n*, about the vehicle and the vehicle environment to the overall control system 90. The one or more data streams 40, 40*a* to 40*n*, contains at least one measurable data parameter 42, 42*a* to 42*n*.

Accordingly, the control system 90 is configured to obtain, via the one or more sensors 82, 84, 86, one or more data streams 40, 40*a* to 40*n* over time from the vehicle 1.

As also illustrated in FIG. 2, the control system 90 favourably also comprises a connection to a remote processing resources, such as cloud-based processing resources 92. The remote server 98 in FIG. 1 may be comprised in this type of cloud layer 92. Hence, the remote server 98 may be comprised in the control system 90. The data parameters 42, 42*a* to 42*n* can be downloaded and uploaded to the remote server 98. In addition, the data parameters 42, 42*a* to 42*n* are here downloaded and uploaded to the storage medium 96. The storage medium 96 may be located in the processor unit 90 of the vehicle or be remotely located in reference to the vehicle 1, and accessible via any suitable wireless connection device comprised by the vehicle, e.g. 3G, LTE, 4G, 5G, WiMAX, etc. The storage medium generally comprises a database.

By way of example, the sensor arrangement 80 comprises one or more vehicle position sensors 82. A position sensor 82 may comprise any one of a radar sensor, lidar sensor, Global Navigation Satellite System (GNSS), vision-based sensor, such as camera, and infra-red sensors.

The one or more vehicle position sensors 82 are arranged to measure one or more vehicle position parameters of the vehicle. The vehicle position parameters are thus one type of data parameters 42*a*. The first set of vehicle position data parameters 42*a* is transferred to the control system 90 in the form of a first set of data streams 40*a*. Further, the control system 90 is configured to obtain the first set of data streams 40*a* containing the first set of vehicle position data parameters 42*a* from the one or more vehicle position sensors 82. In this example, the first set of vehicle position data parameters 42*a* measured by the one or more vehicle position sensors 82 comprise any one of a latitude position, longitudinal position and altitude position of the vehicle.

For example, in order to determine a current position of the vehicle along the route 102, the vehicle here comprises a communications interface comprising a number of antennae or transmitters/receivers for wireless communication. There is for example a receiver and a positioning unit for a satellite based positioning system such as the GPS and/or a system based on GLONASS, BeiDou or GALILEO. The position sensor 82 may advantageously comprise an on-board map database (not shown) wherein for example route segment data may be pre-installed. Furthermore, the map database may be updated, wirelessly and/or provided from an external source via a physical media data carrier such as a flash memory, DVD, hard disc drive or via a wired connection at for example a charging station. The communications interface may further include an antenna and a unit for communicating with the storage medium 96.

Moreover, the sensor arrangement 80 comprises one or more vehicle operating sensors 84. The one or more vehicle operating sensors 84 are arranged to measure one or more vehicle operating parameters of the vehicle 1 along the one or more route segments 103*a* to 103*n* in FIG. 6*a*. The vehicle operating parameters are thus a second type of data parameters 42*b*. The second set of vehicle operating data parameters 42*b* is transferred to the control system 90 in the form of a second set of data streams 40*b*. Further, the control system 90 is configured to obtain the second set of data streams 40*b* containing the second set of vehicle operating data parameters 42*b* from the one or more vehicle operating sensors 84. In this example, the second set of vehicle operating data parameters 42*b* measured by the one or more vehicle operating sensors 84 comprise any one of the following: vehicle pay-load data, vehicle speed, energy storage system type, energy storage system status and characteristics, internal combustion engine system type, electric machine characteristics, operational characteristics of any auxiliary equipment, vehicle specification data. The energy storage system type may be e.g. a battery system, a fuel cell system and the like.

The energy storage system status and characteristics may be any one state-of-charge (SOC), state-of-health (SOH), state-of-energy SOE, state-of-power (SOP), voltage, current, resistance and temperature for a battery-electric vehicle; fuel tank level and fuel type for a vehicle with internal combustion engine; and one or more characteristics for a fuel-cell-electric vehicle.

The electric machine characteristics may be any one of speed of the motor of the electric machine, load on the electric motor, power demand on the electric motor, and torque request on the electric motor.

The auxiliary equipment may be any one of an external cooling unit, a crane, and a concrete mixer.

The vehicle specification data may be data indicative of any one of the axle configuration of the vehicle and the body extension of the vehicle.

In addition, the sensor arrangement 80 here comprises one or more vehicle environment sensors 86. The one or more vehicle environment sensors 86 are arranged to measure one or more vehicle environment parameters, such as the environment surrounding the vehicle along the one or more route segments 103*a* to 103*n* in FIG. 6*a*. The vehicle environment parameters are thus a third type of data parameters 42*c*. The third set of vehicle environment data parameters 42*c* is transferred to the control system 90 in the form of a third set of data streams 40*c*. Further, the control system 90 is configured to obtain the third set of data streams 40*c* containing the third set of vehicle environment data parameters 42*c* from the one or more vehicle environment sensors 86. In this example, the third set of vehicle position data parameters 42*c* measured by the one or more vehicle environment sensors 86 comprise any one of an ambient temperature and a weather condition parameter.

The control system 90 is also configured to transform, by the one or more processor devices 91, each time sequence of one type of obtained data streams 40*a* to 40*n* to a frequency representation. A time sequence here refers to a time related parameter, and may be time of year, time of month, weekday, time of day, hours, mins, seconds, etc. Each data stream is e.g. given a time stamp which indicates the control system time at which the data stream was sent, wherein the control system time may for example be set by the one or more processor devices 91.

By way of example, the one or more processor devices 91 is configured to transform the occurrence of a certain event over a time period, i.e. as a function of time, x(t), to the frequency domain, i.e. as a function of frequency X(ω). Moreover, in this example, the transformation of each time sequence of one type of data streams to a frequency representation is performed by any one of a Discrete Cosine Transform, a Fourier transformation and a Z-transform. Discrete Cosine Transform, Fourier transformation and Z-transform are commonly known mathematical transforms and thus not further described herein.

Further, the control system 90 is configured to identify, by the one or more processor devices 91, one or more relevant components 50 of the frequency spectrum. By way of example, the one or more processor devices 90 is configured to identify relevant components in the frequency spectrum by applying a machine learning technique. Example machine learning techniques include auto encoders, convolutional neural networks or other artificial neural networks; or other algorithms such as ensembles of decision trees ('random forests') or support vector machines.

In addition, the control system 90 is also configured to quantify, by the one or more processor devices 91, the identified one or more relevant components of the frequency spectrum.

The control system 90 is also configured to associate, by the one or more processor devices 91, the identified and quantified relevant components of the frequency spectrum with a given road segment of the route, such as the route segment 103*b*. By way of example, the one or more processor devices 91 is configured to associate the identified and quantified relevant components in the frequency spectrum to a direction of travelling.

The control system 90 is also configured to combine, by the one or more processor devices 91, the associated, quantified and identified relevant components of the frequency spectrum for the given road segment 130*b* from different types of data streams into one route characteristics record 120*a* to 120*n*.

Generally, the one or more processor devices 91 is configured to create one route characteristics record for each one of the road segments 103*a* to 130*n*. However, the one or more processor devices 91 may also be configured to create route characteristics records 120*a* to 120*n* on any one of a road segment level and a route level comprising a number of road segments.

Further, the control system 90 is also configured to store the generated route characteristics record 120*a* to 120*n* in the storage medium 96. Thus, the control system 90 generally comprises a communication link 97 between the one or more processor devices 91 and the storage medium 96. As such, the control system 90 of the vehicle 1 might be configured to establish a communication link 97 to a storage medium 96, as provided in the control system 90, for download of one or more route characteristics record 120*a* to 120*n*. Likewise, upon having performed one or more manoeuvres, this one or more manoeuvres might be uploaded to the storage medium 96 for use by another vehicle when performing an operation along the same route. Also, the one or more processor devices 91 may upon request upload one or more additional route characteristics record 120*a* to 120*n* to the storage medium 96 reflecting additional operations along the route 102.

Moreover, it should be noted that the control system 90 may generally be configured to iterate a number of the operations above. Typically, the control system 90 is configured to obtain different types of data streams 40*a* to 40*n* from the vehicle 1, and subsequently perform the above operations of transforming, identifying, quantifying and associating in an iterative manner for the obtained different types of data streams 40*a* to 40*n*.

The one or more route characteristics record 120*a* to 120*n* are used by the control system 90 in performing a vehicle operation along the route 102. Thus, the control system 90 is configured to generate a part of a vehicle control strategy 110 for the vehicle 1 following the route 102 to the destination 104.

As mentioned above, the route characteristics record 120, 120*a* to 120*n* is stored in the storage medium 96. Moreover, the control system 90 is configured to use one or more stored route characteristics records 120*a* to 120*n* for adapting the vehicle control strategy 110.

In some examples, the one or more processor devices 91 of the control system 90 is itself configured to determine a current vehicle position along the route 102. The vehicle position is determined from data gathered by the vehicle position sensor 82.

Moreover, in some examples, the one or more processor devices 91 of the control system 90 is configured to determine a current time. The current time may also be determined by a time sensor or watch in communication with one or more processor devices 91. Other examples of determining the current time are also conceivable, such as by means of the navigation system etc.

Further, in some examples, the one or more processor devices 91 of the control system 90 is configured to determine a current vehicle operating state. The current vehicle operating state is determined from data gathered by the vehicle operating sensor 84.

The one or more processor devices 91 of the control system 90 is further configured to access the storage medium 96 to acquire one or more historical generated route characteristics records 120*a* to 120*n,* and also configured to compare the determined current vehicle position, current time and current vehicle operating state with corresponding historical data from the one or more historical generated route characteristics records so as to identify one or more matching characteristics therebetween.

Based on the comparison, the one or more processor devices 91 of the control system 90 is configured to select an identified matching route characteristics record. Alternatively, or in addition, the one or more processor devices 91 of the control system 90 is configured to combine different route characteristics records to form a matching composite route characteristics record of several route characteristics records.

The one or more processor devices 91 of the control system 90 is further configured to extract one or more route and vehicle operational requirements from the selected route characteristics record or selected composite route characteristics record. Examples of such route and vehicle operational requirements are one or more of the following: vehicle pay-load requirement, vehicle speed requirement, energy storage system type requirement, energy storage system status, internal combustion engine system type requirement, electric machine characteristics requirement, operational characteristics of any auxiliary equipment, remaining SOC, estimated time to next charge, estimated time required for next charge stop, vehicle acceleration requirement, brake performance requirement, any auxiliary load requirement, etc.

Moreover, the one or more processor devices 91 of the control system 90 is configured to adapt the vehicle control strategy 110 based on the extracted one or more route and vehicle operational requirements, the current vehicle position along the route, the current time and the current vehicle operating state.

To this end, the vehicle control strategy 110 is provided to set at least one operating parameter to control the operation of the vehicle 1 along the route 102.

The one or more processor devices 91 of the control system 90 may also be configured to inform an operator of the vehicle 1 of any desired or needed changes to the operating parameter.

Figure 3:
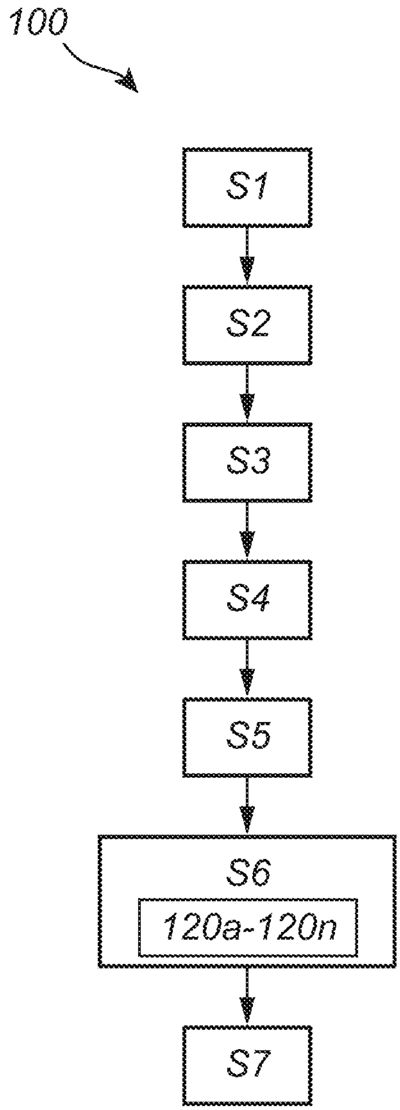
FIGS. 3 to 5 are flow-charts of exemplary methods according to some examples.
Figure 4:
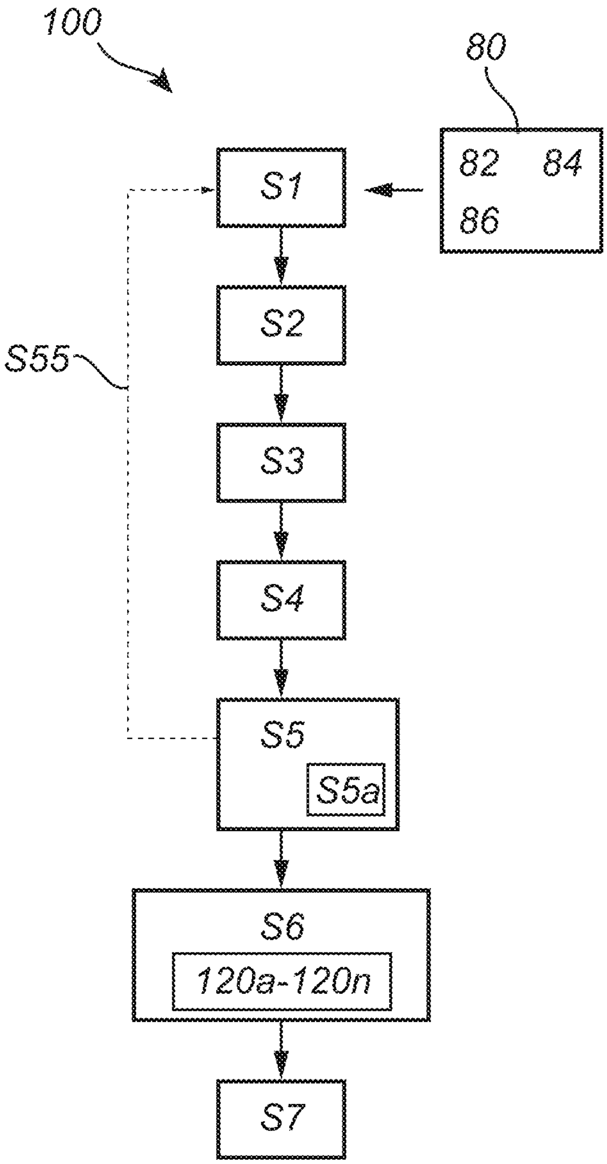
Figure 5:
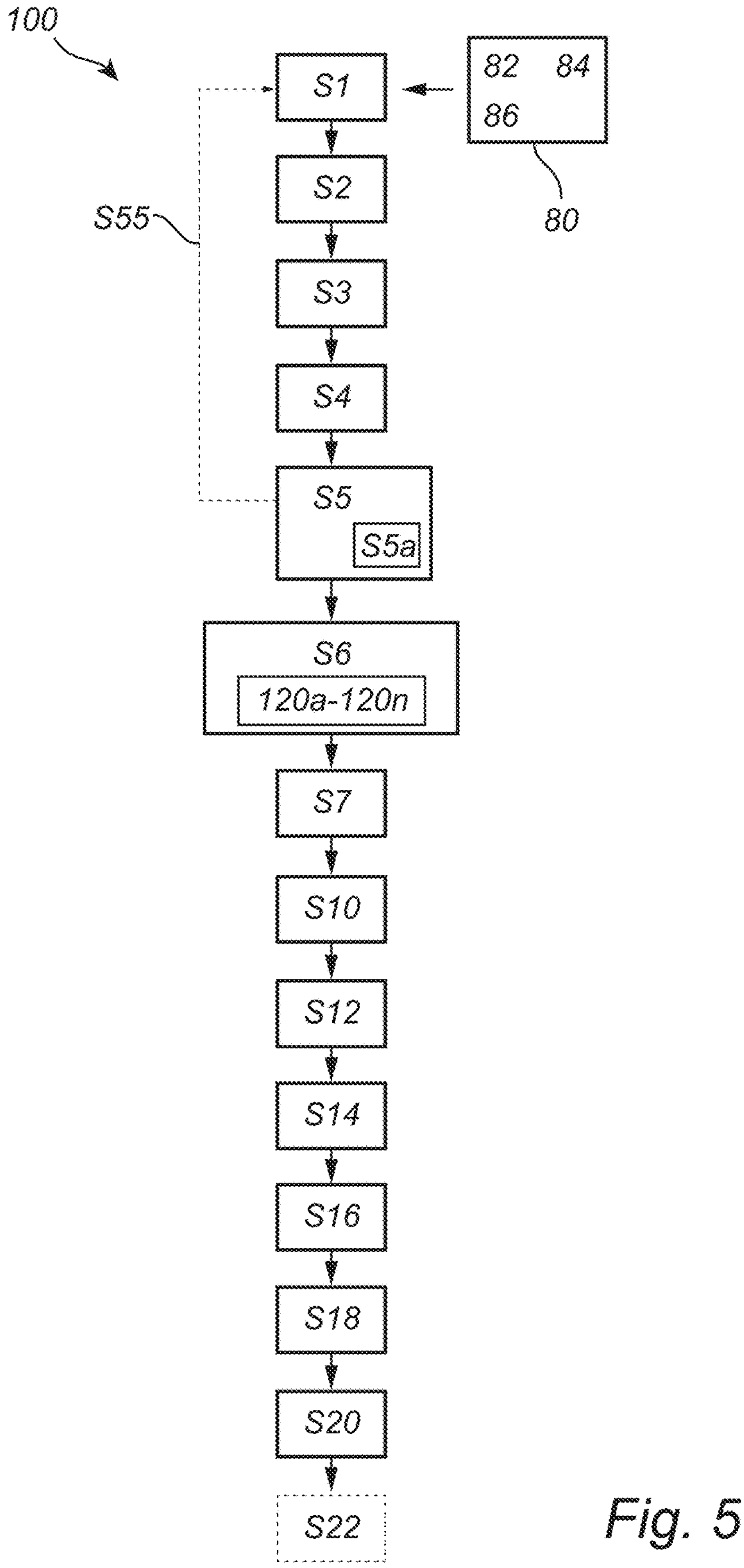

FIGS. 3 to 5 are flow charts which summarize and exemplify the discussions above. Hence, FIGS. 3 to 5 schematically illustrate some examples of the computer-implemented methods of the disclosure. The methods may be performed by the control system 90, 200 of the vehicle 1. In some examples, the methods may be performed by the control systems 90, 200 in combination with the remote server 98. In some examples, the control system 90, 200 may fully, or at least in part be integrated into the remote server 98. The processor device of the control system 90, 200 may be implemented in a central processing unit, the ECU, or distributed over several units as one or more processor devices.

Turning now to FIG. 3, there is illustrated one general example of the method 100. The method 100 in FIG. 3 is provided to generate a part of a vehicle control strategy 110 for the vehicle 1 following the route 102 to the destination 104. The method is implemented by the control system 90 which at least comprises the one or more processor devices 91, the sensors assembly 80 and the storage medium 96, as mentioned herein.

In FIG. 3, the method 100 comprises a step of obtaining S1, via the one or more sensors 82, 84, 86, one or more data streams 40, 40*a* to 40*n* over time from the vehicle 1, the one or more data streams containing at least one measurable data parameter 42, 42*a* to 42*n.*

In addition, the method 100 comprises a step of transforming S2, by the one or more processor devices 91, each time sequence of one type of obtained data streams to a frequency representation. By way of example, the method 100 comprises a step of transforming the occurrence of a certain event over a time period, i.e. as function of time, x(t), to the frequency domain, i.e. as a function of frequency X(ω).

Further, the method 100 comprises a step of identifying S3, by the one or more processor devices 91, one or more relevant components 50 of the frequency spectrum.

Also, the method 100 comprises a step of quantifying S4, by the one or more processor devices 91, the identified one or more relevant components 50 of the frequency spectrum.

Subsequently, the method 100 comprises a step of associating S5, by the one or more processor devices, the identified and quantified relevant components of the frequency spectrum with a given road segment of the route.

Moreover, the method 100 comprises a step of combining S6, by the one or more processor devices, the associated, quantified and identified relevant components of the frequency spectrum for the given road segment from different types of data streams into one route characteristics record 120*a* to 120*n.*

Finally, the method 100 comprises a step of storing S7 the generated route characteristics record in the storage medium 96.

Favourably, the method 100 comprises a step of obtaining the one or more data streams containing at least one measurable data from one or more sensors 80, 82 arranged to measure one or more vehicle position parameters of the vehicle 1. By way of example, the at least one measurable data from the one or more sensors 82 arranged to measure one or more vehicle position parameters comprise any one of a latitude position, longitudinal position and altitude position of the vehicle. The method 100 may also comprises a step of obtaining the one or more data streams containing at least one measurable data from one or more sensors arranged to measure one or more vehicle operating parameters 84 along the given route segment. The method 100 may further comprises a step of obtaining the one or more data streams containing at least one measurable data from one or more sensors 86 arranged to measure one or more vehicle environmental parameters.

The step of transforming S2 each time sequence of one type of data streams to a frequency representation is by way of example performed by any one of a Discrete Cosine Transform, a Fourier transformation and a Z-transform.

The step of identifying S3 relevant components 50 in the frequency spectrum is by way of example performed by applying a machine learning technique.

In addition, the step of combining S6 the associated, quantified and identified relevant components in the frequency spectrum for the given road segment from different types of data streams into one route characteristics record 120*a* to 120*n* is here performed on any one of a road segment level and a route level comprising a number of road segments.

FIG. 4 illustrates another example method 100. The method 100 in FIG. 4 here comprises the steps described in relation to FIG. 3. In addition, in this example method, the step of associating S5 the identified and quantified relevant components in the frequency spectrum with a given road segment comprises associating S5*a* the identified and quantified relevant components in the frequency spectrum to a direction of travelling.

Moreover, in this example in FIG. 4, the method 100 further comprises obtaining different types of data streams from the vehicle, and iterating S55 the steps of transforming, identifying, quantifying and associating for the obtained different types of data streams.

FIG. 5 illustrates another example method 100. The method 100 in FIG. 5 here comprises the steps described in relation to FIG. 3. Favourably, the method 100 in FIG. 5 also comprises the steps described in relation to FIG. 4. In addition, in this example method, the method 100 is intended to use at least one stored route characteristics record adapting a vehicle control strategy 110 of the vehicle 1.

As such, the method further comprises a step of determining S10 a current vehicle position along the route, a current time and a current vehicle operating state; a step of accessing S12 the storage medium 96 to acquire one or more historical generated route characteristics records; and a step of comparing S14 the determined current vehicle position, current time and current vehicle operating state with corresponding historical data from the one or more historical generated route characteristics records so as to identify one or more matching characteristics therebetween.

Moreover, based on the comparison, the method 100 comprises a step of selecting S16 an identified matching route characteristics record. In addition, or alternatively, based on the comparison, the method 100 comprises a step of combining S16 different route characteristics records to form a matching composite route characteristics record of several route characteristics records.

Subsequently, the method 100 comprises a step of extracting S18 one or more route and vehicle operational requirements from the selected route characteristics record or selected composite route characteristics record.

Then, the method 100 further comprises a step of adapting S20 the vehicle control strategy 110 based on the extracted one or more route and vehicle operational requirements, the current vehicle position along the route, the current time and the current vehicle operating state.

Thereafter, the method 100 further comprises using the vehicle control strategy 110 to set at least one operating parameter to control the operation of the vehicle 1 along the route 102.

Favourably, in this example, the method further comprises a step of informing S22 an operator of the vehicle 1 of any desired or needed changes to the operating parameter.

As mentioned above, FIG. 6*a* illustrates an example of the vehicle 1 following the route 102 to the destination 10. The route 102 extends through one or more route segments 103*a* to 103*n*.

The route 102 may either be a reoccurring route or a fixed route. A reoccurring route may be understood as a route on which the vehicle travels frequently. A reoccurring route offers a greater opportunity for gathering data in which correlations between for example payload and location, speed and time of day or weather and battery discharge rate may be found. Furthermore, the expression “fixed” route is intended to indicate that the route may not be re-routed. A specific case of a reoccurring fixed route is a public transport line, such as a bus route. It occurs several times each day, and may not be re-routed (to any greater extent) as there are predefined bus-stops that need to be frequented. Other examples include some delivery routes, such as a mail delivery route.

Below is described one illustrative example of the methods described above for generating a part of the vehicle control strategy 110 for the vehicle 1 following the route 102 to the destination 104 as well as using one or more route characteristics records in adapting a subsequent vehicle control strategy 110 for the vehicle 1, or another vehicle, operating along the route 102. The example is schematically illustrated in FIGS. 6*a* and 6*b*.

Figure 6B:
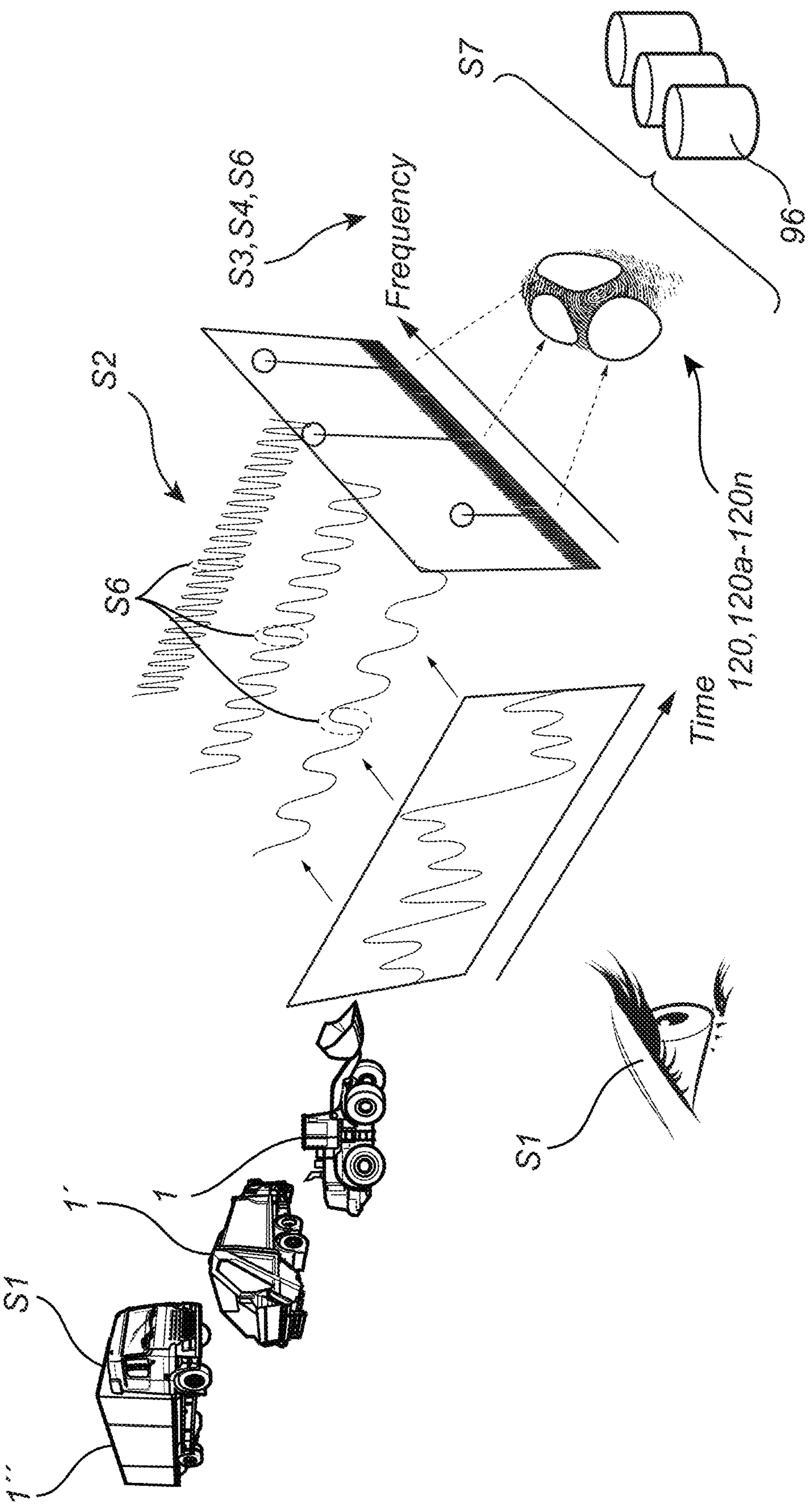

As illustrated in FIGS. 6*a* and 6*b*, the vehicle 1 is travelling along the route from 102 to 104 (FIG. 6*a*). In this example, the various route segments may be considered examples of vehicle position parameters (i.e. the first set of vehicle position data parameters 42*a*). At the various route segments 103*a* to 103*n*, the processor unit 91 receives data, or status data, about the vehicle position. The vehicle position is here determined based on vehicle position parameters such as the latitude position, the longitudinal position and the altitude position of the vehicle.

Also, at the various route segments 103*a* to 103*n*, the processor unit 91 receives data, or status data, about the following vehicle operating parameters: vehicle payload status, current vehicle speed, energy storage system status, remaining SOC, estimated time to next charge, estimated time required for next charge stop, vehicle acceleration, brake performance, any auxiliary load etc.

The processor unit 91 also receives data on the environment surrounding the vehicle 1 in these route segments 103*a* to 103*n*. This data is gathered by one or more vehicle environment sensors 86 arranged to measure one or more vehicle environment parameters. The data here contains information about the current ambient temperature and one or more weather condition parameters, such as wind speed/direction. The data may also contain information about traffic density. The traffic density can be obtained from the vehicle environment sensors 86 and/or from the control unit in cooperation with the navigation system.

The above gathering of data here corresponds to the step S1 of obtaining one or more data streams 40, 40*a* to 40*n* over time from the vehicle 1.

As also illustrated in FIG. 6*b*, a number of different types of vehicles can be used to gather data so as to define and build a global database of route characteristics records. In other words, in FIG. 6*b*, there are e.g. three different types of vehicles 1, 1' and 1" operated along the route to obtain one or more data streams 40, 40*a* to 40*n* over time.

In other words, the control system 90 is configured to gather and analyse a plurality of data streams over time from one or more vehicles 1, 1' and 1".

In order to further evaluate the data streams 40*a* to 40*n*, the control system 90 is configured to transform each time sequence of one type of obtained data streams to a frequency representation, which may be gleaned from FIG. 6*b* (step S2). By way of example, the control system 90 transforms the occurrence of a certain event (such as the driver changing gear) or the value of a continuous quantity (such as the power outtake from the energy storage system or the height of the rear-axle suspension) over a time period, i.e. as a function of time, x(t), to the frequency domain, i.e. as a function of frequency X(ω). In the first case, the resulting frequency spectrum could for instance contain one peak indicating a series of rapid gear changes, and another peak for the infrequent gear changes associated with regular highway driving. Similarly, the frequency spectrum for the suspension could have a peak indicating rapid up-and-down movement associated with poor road surface conditions.

Next, the control system 90 identifies (step S3), by the one or more processor devices 91, one or more relevant components 50 of the frequency spectrum. The relevant component 50 of the frequency spectrum here refers to a part of the frequency spectrum for a given data stream. By way of example, a relevant component of the frequency spectrum can be identified by considering the peaks of the frequency spectrum for a given time period, as may be gleaned from FIG. 6*b*. The peak may e.g. be an indication of poor road surface along the route 102, as mentioned above. In a similar vein, a peak (relevant component) in the frequency spectrum of the angle of rotation of the steering wheel can be an indication of a curvy route segment.

Subsequently, the control system 90 performs a quantification operation (corresponding to step S4), in which a value, such as a ranking, is set for the various identified relevant components of the frequency spectrum. In addition, or alternatively, the control system 90 performs a quantification operation (step S4), in which a severity factor is set for the various identified relevant components of the frequency spectrum. By way of example, a route segment having two identified relevant components of the frequency spectrum for the suspension may obtain a higher severity factor than a route segment with only one identified relevant component.

Next, the control system 90 performs an association operation (corresponding to step S5), in which the identified and quantified relevant components of the frequency spectrum are associated with a given road segment of the route. That is, the control system 90 compares the time of occurrence of certain identified relevant components of the frequency spectrum with the position of the vehicle (i.e. location) at that time.

Thereafter, the control system 90 combines the above associated, quantified and identified relevant components of the frequency spectrum for the given road segment from different types of data streams into one route characteristics record and stores the generated route characteristics record in the storage medium, as may be gleaned by step S6 and step S7 in FIG. 6*b*. The route characteristics record may contain both 1) the individual quantified relevant components for each signal (data stream), and 2) a compact representation of all quantified relevant components (for all the signals, corresponding to the data streams) associated with the given road segment. The latter compact representation is obtained using one or several information compression or dimensionality reduction algorithms, such as principal component analysis or auto encoder artificial neural networks. The main purpose of the compact representation is to facilitate an efficient comparison between different route characteristics records.

In one example, the control system 90 also combines (step S16) different existing (historical) route characteristics records from the storage medium to form a matching composite route characteristics record based on several individual route characteristics records. This can e.g. be performed by combining route characteristics records generated by several different vehicles operating along the same route 102 in FIG. 6*a*.

In one example, one of the vehicles in FIG. 6*b* may also use the obtained route characteristics record (composite or otherwise) in performing a subsequent operation along the route 102, corresponding to adapting a control strategy for the vehicle.

Accordingly, by way of example, the control system 90 determines (step S10) a current vehicle position along the route, a current time and a current vehicle operating state. This is used to calculate the current route characteristics record, and can be done by any one of the one or more processor devices.

Next, the control system 90 communicates and accesses (step S12) the memory to acquire one or more historical generated route characteristics records. These may have been generated by the current vehicle, or by any other vehicle with sufficiently similar characteristics and operating state. This step can be done by any one of the one or more processor devices.

Thereafter, the control system 90 compares (step S14) the current route characteristics record (and/or the underlying current vehicle position, time and vehicle operating state) with corresponding historical data from the one or more historical generated route characteristics records, so as to identify one or more matching characteristics therebetween. This comparison and identification can be done using a variety of techniques, for instance by calculating a distance measure (such as the cosine similarity) in a suitably reduced representation space obtained using dimensionality reduction techniques such as principal component analysis (PCA) or t-distributed stochastic neighbor embedding (t-SNE). The processing can be done by any one of the one or more processor devices.

Based on the comparison, the control system 90 selects (step S16) an identified matching route characteristics record or combines (step S16) different route characteristics records to form a matching composite route characteristics record of several route characteristics records. The composite route characteristics record provides the possibility to optimize the similarity to the current vehicle operating state and needs, for instance by collecting information on propulsion battery power outtake from one vehicle/record and settings for suspension stiffness from another. The selection and combination can be done by any one of the one or more processor devices.

Next, the control system 90 extracts (step S18) one or more route and vehicle operational requirements from the selected route characteristics record or selected composite route characteristics record, which can be done by any one of the one or more processor devices. For instance, given the current vehicle weight, the route might require unusually high power outtake for a limited time to successfully ascend a steep hill.

Subsequently, the control system 90 adapts (step S20) the vehicle control strategy based on the extracted one or more route and vehicle operational requirements, the current vehicle position along the route, the current time and the current vehicle operating state. This can be done by any one of the one or more processor devices. In the above example, the safety limits on power take-out or the operating temperature of the engine or propulsion battery could be relaxed for a limited time to allow for the additional power need. Other examples include optimizing the propulsion battery state of charge to ensure efficient use of regenerative braking in an upcoming long downhill descent, or automatically tweaking steering response and suspension stiffness on curvy road segments.

As such, there is provided an adapted control strategy for the vehicle where the vehicle control strategy is provided to set at least one operating parameter to control the operation of the vehicle. This can be done by any one of the one or more processor devices.

It should be noted that the computer system 90 may include any collection of processing devices that individually or jointly execute the steps to perform any one or more of the above operations as discussed above. Only by way of example, one processing device may be arranged in each one of the vehicles, while another common processing device is arranged in a remote-control center, such that some instructions and processing operations are partly performed in the processing devices of the vehicles, while other instructions and processing operations are partly performed in the processing device of the control center. The processing devices jointly define the control system 90. One example of a control system will now be described in relation to FIG. 7.

FIG. 7 is a schematic diagram of the control system 200. The control system is here provided as a computer system 200 for implementing examples disclosed herein. The computer system 200 is adapted to execute instructions from a computer-readable medium to perform these and/or any of the functions or processing described herein. The computer system 200 may be connected (e.g., networked) to other machines in a LAN, an intranet, an extranet, or the Internet. While only a single device is illustrated, the computer system 200 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 200 may comprise at least one computing device or electronic device capable of including firmware, hardware, and/or executing software instructions to implement the functionality described herein. The computer system 200 may include a processor device 202 (may also be referred to as a control unit), but generally a number of processor devices, a memory 204, and a system bus 206. The computer system 200 may include at least one computing device having the processor device 202. The system bus 206 provides an interface for system components including, but not limited to, the memory 204 and the processor device 202. The processor device 202 may include any number of hardware components for conducting data or signal processing or for executing computer code stored in memory 204. The processor device 202 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 206 may be any of several types of bus structures that may further interconnect to a memory bus (with or without a memory controller), a peripheral bus, and/or a local bus using any of a variety of bus architectures. The memory 204 may be one or more devices for storing data and/or computer code for completing or facilitating methods described herein. The memory 204 may include database components, object code components, script components, or other types of information structure for supporting the various activities herein. Any distributed or local memory device may be utilized with the systems and methods of this description. The memory 204 may be communicably connected to the processor device 202 (e.g., via a circuit or any other wired, wireless, or network connection) and may include computer code for executing one or more processes described herein. The memory 204 may include non-volatile memory 208 (e.g., read-only memory (ROM), erasable programmable read-only memory (EPROM), electrically erasable programmable read-only memory (EEPROM), etc.), and volatile memory 210 (e.g., random-access memory (RAM)), or any other medium which can be used to carry or store desired program code in the form of machine-executable instructions or data structures and which can be accessed by a computer or other machine with a processor device 202. A basic input/output system (BIOS) 212 may be stored in the non-volatile memory 208 and can include the basic routines that help to transfer information between elements within the computer system 200.

The computer system 200 may further include or be coupled to a non-transitory computer-readable storage medium such as the storage device 214, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 214 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 214 and/or in the volatile memory 210, which may include an operating system 216 and/or one or more program modules 218. All or a portion of the examples disclosed herein may be implemented as a computer program product 220 stored on a transitory or non-transitory computer-usable or computer-readable storage medium (e.g., single medium or multiple media), such as the storage device 214, which includes complex programming instructions (e.g., complex computer-readable program code) to cause the processor device 202 to carry out the steps described herein. Thus, the computer-readable program code can comprise software instructions for implementing the functionality of the examples described herein when executed by the processor device 202. The processor device 202 may serve as a controller or control system for the computer system 200 that is to implement the functionality described herein.

The computer system 200 may include an input device interface 222 (e.g., input device interface and/or output device interface). The input device interface 222 may be configured to receive input and selections to be communicated to the computer system 200 when executing instructions, such as from a keyboard, mouse, touch-sensitive surface, etc. Such input devices may be connected to the processor device 202 through the input device interface 222 coupled to the system bus 206 but can be connected through other interfaces such as a parallel port, an Institute of Electrical and Electronic Engineers (IEEE) 1394 serial port, a Universal Serial Bus (USB) port, an IR interface, and the like. The computer system 200 may include an output device interface 224 configured to forward output, such as to a display, a video display unit (e.g., a liquid crystal display (LCD) or a cathode ray tube (CRT)). The computer system 200 may also include a communications interface 226 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

Example 1. A method 100 for generating a part of a vehicle control strategy 110 for a vehicle following a route 102 to a destination 104, said route extending through one or more route segments **103*a* to 103*n*, said method being implemented by a control system 90 comprising one or more processor devices 91, one or more sensors 80 and a storage medium 96**, said method comprising:

obtaining S1, via the one or more sensors, one or more data streams 40, **40*a* to 40*n* over time from the vehicle, said one or more data streams containing at least one measurable data parameter 42, 42*a* to 42*n***;

transforming S2, by the one or more processor devices, each time sequence of one type of obtained data streams to a frequency representation;

identifying S3, by the one or more processor devices, one or more relevant components 50 of the frequency spectrum;

quantifying S4, by the one or more processor devices, the identified one or more relevant components of the frequency spectrum;

associating S5, by the one or more processor devices, the identified and quantified relevant components of the frequency spectrum with a given road segment of the route;

combining S6, by the one or more processor devices, the associated, quantified and identified relevant components of the frequency spectrum for the given road segment from different types of data streams into one route characteristics record **120*a* to 120*n*; and storing S7 the generated route characteristics record in the storage medium 96**.

Example 2: The method according to example 1, further comprising obtaining the one or more data streams containing at least one measurable data from one or more sensors 80, 82 arranged to measure one or more vehicle position parameters of the vehicle.

Example 3: The method according to any one of examples 1 or 2, further comprising obtaining the one or more data streams containing at least one measurable data from one or more sensors 80, 84 arranged to measure one or more vehicle operating parameters along the given route segment.

Example 4: The method according to example 3, wherein the one or more vehicle operating parameters comprise any one of the following: vehicle pay-load data, vehicle speed, energy storage system type, energy storage system status and characteristics, internal combustion engine system type, electric machine characteristics, operational characteristics of any auxiliary equipment, vehicle specification data.

Example 5: The method according to any one of the preceding examples, further comprising obtaining the one or more data streams containing at least one measurable data from one or more sensors 80, 86 arranged to measure one or more vehicle environmental parameters.

Example 6: The method according to example 5, wherein the at least one measurable data from the one or more sensors 80, 86 arranged to measure one or more vehicle environmental parameters comprises any one of an ambient temperature and a weather condition parameter.

Example 7: The method according to any one of the preceding examples, wherein transforming S2 each time sequence of one type of data streams to a frequency representation is performed by any one of a Discrete Cosine Transform, a Fourier transformation and a Z-transform.

Example 8: The method according to any one of the preceding examples, wherein identifying S3 relevant components in the frequency spectrum is performed by applying a machine learning technique.

Example 9: The method according to any one of the preceding examples, wherein associating S5 the identified and quantified relevant components in the frequency spectrum with a given road segment further comprises associating S**5*a*** the identified and quantified relevant components in the frequency spectrum to a direction of travelling.

Example 10: The method according to any one of the preceding examples, wherein combining S6 the associated, quantified and identified relevant components in the frequency spectrum for the given road segment from different types of data streams into one route characteristics record **120*a* to 120*n*** is performed on any one of a road segment level and a route level comprising a number of road segments.

Example 11: The method according to any one of the preceding examples, further comprising obtaining different types of data streams from the vehicle, and iterating the steps of transforming, identifying, quantifying and associating for the obtained different types of data streams.

Example 12: The method according to any one of the preceding examples, wherein at least one stored route characteristics record is used for adapting a vehicle control strategy, said method further comprising:

determining S10 a current vehicle position along the route, a current time and a current vehicle operating state;

accessing S12 the storage medium to acquire one or more historical generated route characteristics records;

comparing S14 the determined current vehicle position, current time and current vehicle operating state with corresponding historical data from the one or more historical generated route characteristics records so as to identify one or more matching characteristics therebetween;

based on the comparison, selecting S16 an identified matching route characteristics record or combining S16 different route characteristics records to form a matching composite route characteristics record of several route characteristics records;

extracting S18 one or more route and vehicle operational requirements from the selected route characteristics record or selected composite route characteristics record; and adapting S20 the vehicle control strategy based on the extracted one or more route and vehicle operational requirements, the current vehicle position along the route, the current time and the current vehicle operating state, wherein said vehicle control strategy is provided to set at least one operating parameter to control the operation of the vehicle.

Example 13: The method according to example 12, further comprising informing S22 an operator of the vehicle of any desired or needed changes to the operating parameter.

Example 14: A computer program product comprising program code for performing, when executed by the one or more processor devices, the method of any of examples 1-13.

Example 15: A control system 90 comprising one or more sensors 80 and one or more processor devices 91 configured to perform the steps of the method according to any of examples 1-13.

Example 16: A non-transitory computer-readable storage medium comprising instructions, which when executed by the one or more processor devices, cause the one or more processor devices to perform the method of any of examples 1 to 13.

Example 17: A vehicle 1 comprising one or more processor devices to perform the method of any of examples 1 to 13 and/or a control system according to example 15.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A method for generating a part of a vehicle control strategy for a vehicle following a route to a destination, said route extending through one or more route segments, said method being implemented by a control system comprising one or more processor devices, one or more sensors and a storage medium, said method comprising:

obtaining, via the one or more sensors, one or more data streams over time from the vehicle, said one or more data streams containing at least one measurable data parameter and comprising different types of data streams from the vehicle;

transforming, by the one or more processor devices, each time sequence of one type of obtained data streams to a frequency representation comprising a frequency spectrum; identifying, by the one or more processor devices, one or more relevant components of the frequency spectrum;

quantifying, by the one or more processor devices, the identified one or more relevant components of the frequency spectrum;

associating, by the one or more processor devices, the identified and quantified relevant components of the frequency spectrum with a given road segment of the route;

combining, by the one or more processor devices, the associated, quantified and identified relevant components of the frequency spectrum for the given road segment from the different types of data streams into one route characteristics record, wherein said combining is performed on any one of a road segment level and a route level comprising a number of road segments;

storing the route characteristics record in the storage medium; and using at least one stored route characteristics record for adapting the vehicle control strategy by extracting one or more route and vehicle operational requirements from the stored route characteristics record, wherein said vehicle control strategy is provided to set at least one operating parameter to control the operation of the vehicle.

2. Method according to claim 1, further comprising obtaining the one or more data streams containing at least one measurable data from one or more sensors arranged to measure one or more vehicle position parameters of the vehicle.

3. Method according to claim 1, further comprising obtaining the one or more data streams containing at least one measurable data from one or more sensors arranged to measure one or more vehicle operating parameters along the given route segment.

4. Method according to claim 3, wherein the one or more vehicle operating parameters comprise any one of the following: vehicle pay-load data, vehicle speed, energy storage system type, energy storage system status and characteristics, internal combustion engine system type, electric machine characteristics, operational characteristics of any auxiliary equipment, vehicle specification data.

5. Method according to claim 1, further comprising obtaining the one or more data streams containing at least one measurable data from one or more sensors arranged to measure one or more vehicle environmental parameters.

6. Method according to claim 5, wherein the at least one measurable data from the one or more sensors arranged to measure one or more vehicle environmental parameters comprises any one of an ambient temperature and a weather condition parameter.

7. Method according to claim 1, wherein transforming each time sequence of one type of data streams to a frequency representation is performed by any one of a Discrete Cosine Transform, a Fourier transformation and a Z-transform.

8. Method according to claim 1, wherein identifying relevant components in the frequency spectrum is performed by applying a machine learning technique.

9. Method according to claim 1, wherein associating the identified and quantified relevant components in the frequency spectrum with a given road segment further comprises associating the identified and quantified relevant components in the frequency spectrum to a direction of travelling.

10. Method according to claim 1, further comprising iterating the transforming, identifying, quantifying and associating for the different types of data streams.

11. Method according to claim 1, wherein at least one stored route characteristics record is used for adapting a vehicle control strategy, said method further comprising:

determining a current vehicle position along the route, a current time and a current vehicle operating state;

accessing the storage medium to acquire one or more historical generated route characteristics records;

comparing the determined current vehicle position, current time and current vehicle operating state with corresponding historical data from the one or more historical generated route characteristics records so as to identify one or more matching characteristics therebetween;

based on the comparison, selecting an identified matching route characteristics record or combining different route characteristics records to form a matching composite route characteristics record of several route characteristics records; extracting one or more route and vehicle operational requirements from the selected route characteristics record or selected composite route characteristics record; and adapting the vehicle control strategy based on the extracted one or more route and vehicle operational requirements, the current vehicle position along the route, the current time and the current vehicle operating state, wherein said vehicle control strategy is provided to set at least one operating parameter to control the operation of the vehicle.

12. Method according to claim 11, further comprising informing an operator of the vehicle of any desired or needed changes to the operating parameter.

13. A control system comprising one or more sensors and one or more processor devices configured to perform the steps of the method according to claim 1.

14. A non-transitory computer-readable storage medium comprising instructions, which when executed by the one or more processor devices, cause the one or more processor devices to perform the method of claim 1.

15. A vehicle comprising one or more processor devices to perform the method of claim 1.

* * * * *